United States Patent [19]

Ferrence

[11] Patent Number: 5,015,141
[45] Date of Patent: May 14, 1991

[54] FREIGHT TRANSPORTATION SYSTEM

[75] Inventor: David N. Ferrence, Kingston, Canada

[73] Assignee: Utdc, Inc., Kingston, Canada

[21] Appl. No.: 516,965

[22] Filed: Apr. 30, 1990

Related U.S. Application Data

[62] Division of Ser. No. 263,445, Oct. 27, 1988, abandoned.

[51] Int. Cl.⁵ ..................... B65G 67/28; B65G 59/02
[52] U.S. Cl. ................................ 414/395; 198/476.1;
198/704; 198/705; 414/411; 414/417; 414/18;
414/917; 296/100
[58] Field of Search ............... 414/373, 390, 392, 395,
414/396, 401, 403, 411, 417, 917, 749, 18, 19,
585, 337, 391; 198/476.1, 704, 705; 296/100

[56] References Cited

U.S. PATENT DOCUMENTS

| | | | |
|---|---|---|---|
| 3,184,898 | 5/1965 | Berney | 414/411 X |
| 3,638,809 | 2/1972 | Grundon | |
| 3,960,280 | 6/1976 | Stolzer | 414/417 X |
| 4,005,787 | 2/1977 | Sleep | |
| 4,016,991 | 4/1977 | Oldford | |
| 4,125,196 | 11/1978 | Liberman et al. | 414/417 X |
| 4,147,264 | 4/1979 | Harvey et al. | 414/411 |
| 4,183,707 | 1/1980 | DAloia | 198/704 X |
| 4,231,697 | 11/1980 | Franz | 414/417 X |
| 4,373,611 | 2/1983 | Frederick | 414/390 X |
| 4,402,644 | 9/1983 | Barchard | 414/417 |

FOREIGN PATENT DOCUMENTS

| | | | |
|---|---|---|---|
| 1808429 | 7/1970 | Fed. Rep. of Germany . | |
| 2137009 | 2/1972 | Fed. Rep. of Germany . | |
| 8005097 | 10/1980 | Fed. Rep. of Germany . | |
| 777078 | 2/1935 | France | 414/395 |
| 684252 | 3/1965 | Italy | 414/392 |
| 56-149909 | 11/1981 | Japan | 198/704 |
| 59-22825 | 2/1984 | Japan | 414/392 |
| 1313788 | 4/1973 | United Kingdom . | |
| 2106070 | 4/1983 | United Kingdom | 414/392 |

Primary Examiner—Robert J. Spar
Assistant Examiner—Robert S. Katz
Attorney, Agent, or Firm—Fleit, Jacobson, Cohn, Price, Holman & Stern

[57] ABSTRACT

A freight transportation system is provided and comprises a loading station, an unloading station and a vehicle moveable therebetween to transport freight. The vehicle includes a lower platform for carrying freight and a pair of doors moveable between open and closed positions. In the closed position, the doors constitute side walls to prevent removal of the freight from the vehicle. In the open position, the doors are located to facilitate removal of the freight from the vehicle. The unloading station includes a door moving mechanism for moving the doors of the vehicle to the open position upon its arrival at the station. A freight removal device moves the freight off of one side of the platform when the doors are moved to the open position.

47 Claims, 7 Drawing Sheets

FREIGHT TRANSPORTATION SYSTEM

This is a division of application Ser. No. 07/263,445, filed Oct. 27, 1988 now abandoned The present invention relates to freight transportation systems and more particular to arrangements for facilitating the unloading of freight.

Arrangements for transporting freight are well known in the art. For long distance freight transportation, large rail cars or trucks are utilized which are unloaded with specialized equipment such as fork lift trucks. The time taken to unload the freight is small compared with the transportation time and therefore is not of primary concern. There is however a need for transportation systems which convey freight over a relatively short distance and in which the time taken to unload is a significant part of the overall handling time. An example of such an application is in airports when baggage must be transported between terminals. Conveyor belt systems have been typically used to avoid unloading but the speed at which the baggage is transported is slow and the conveyor belt systems are prone to failure. Other baggage handling arrangements have been considered which use gas powered carts for transporting baggage. However, problems exist in these arrangements in that the manpower required to remove the baggage from the carts once the baggage has been transported, is expensive.

It is therefore an object of the present invention to obviate or mitigate the above disadvantages by providing a novel freight transport system.

According to one aspect of the present invention there is provided a freight transportation system comprising a loading station, an unloading station and a vehicle movable therebetween to transport freight, said vehicle including a support platform to carry said freight and retaining means on the platform, said retaining means being movable from a first position in which removal of freight is inhibited and a second position in which removal of freight is permitted, said unloading station including opening means operable on said retaining means to move it between said first and second positions upon arrival of the vehicle at said unloading station and freight discharge means operable to discharge freight from the platform to one side of said vehicle.

In another aspect of the present invention there is provided a freight transportation system comprising a loading station, an unloading station and a vehicle moveable therebetween, said vehicle including a support platform to carry freight and a pair of doors located on opposite sides of the said vehicle, said doors being moveable from a first position in which removal of freight is inhibited to a second position in which removal of freight is permitted, said unloading station including opening means operable upon said doors when said vehicle is stationary to move said doors concurrently to said second position to permit removal of said freight.

In another aspect of the present invention there is provided a freight transportation vehicle comprising a platform, a door located on opposite sides of said platform and each movable from a first position in which they inhibit removal of freight from said platform to a second position in which they permit removal of freight from said platform, said doors being pivotally mounted above their upper edge to cause movement laterally away from said platform upon movement from said first position to said second position.

In still yet another aspect of the present invention there is provided a freight discharge apparatus comprising a base, a boom mounted on said base and drive means operable to cause said boom to move across a planer surface and discharge freight therefrom.

An embodiment of the present invention will now be described by way of example only with reference to the accompanying drawings in which.

Figure 1:
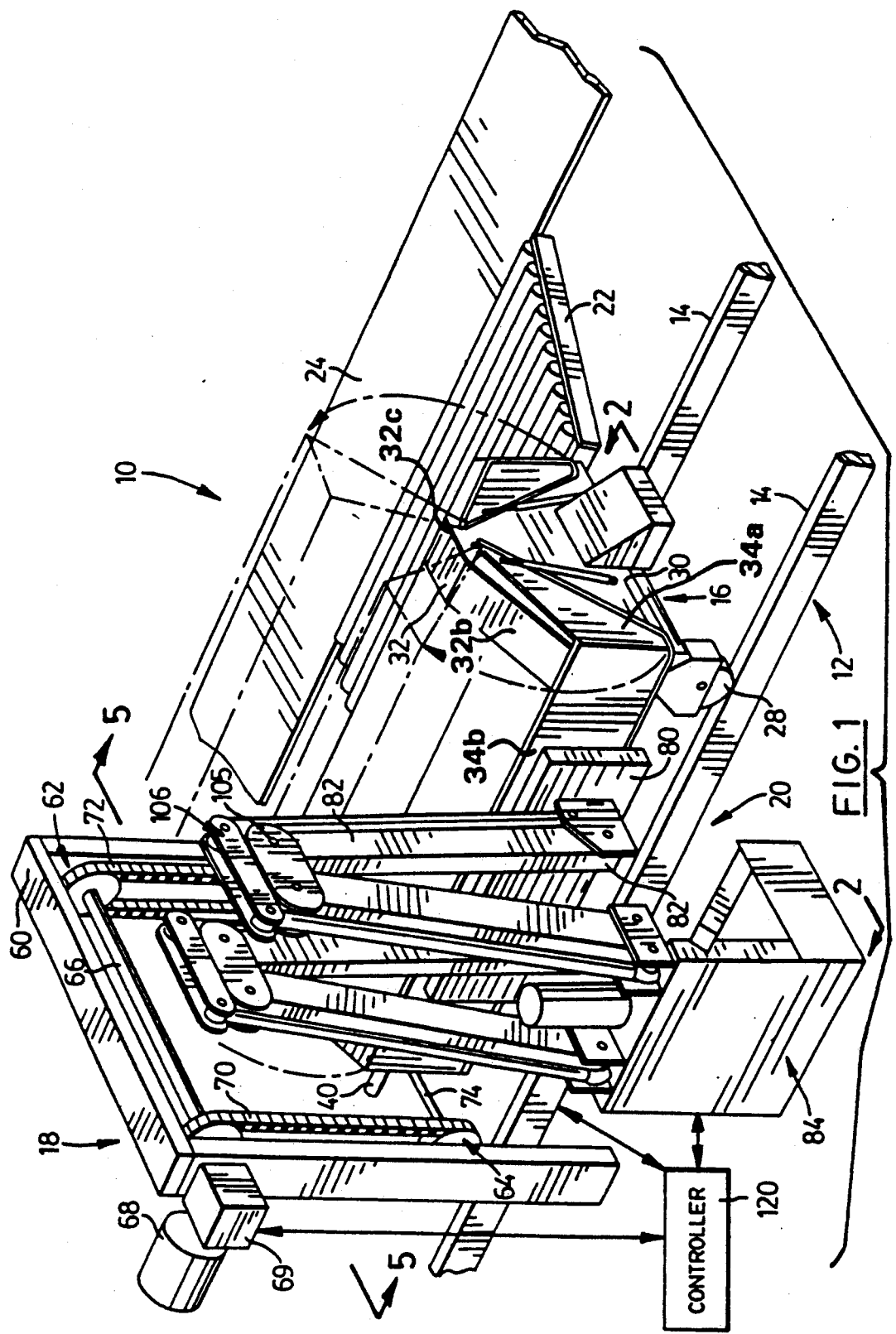
FIG. 1 is a perspective view of a freight transportation system.

Referring to FIG. 1, a freight transportation system in the form of a baggage transport and removal system is generally shown at reference numeral 10. The system 10 includes a track 12 having a pair of rails 14 for supporting a wheeled baggage cart 16 powered by in track linear induction motors (LIM's) (not shown). A door opening mechanism 18 straddles the track 12 and opens the doors of the baggage cart 16 when the cart is in the unloading station. A baggage removing device 20 is positioned on one side of the track 12 for removing the baggage from the cart 16. A roller set 22 is positioned on the other side of the track 12 and receives the baggage after it has been pushed off of the cart 16. A conveyor belt or carousel 24 receives the baggage from the roller set 22 and transports the baggage at a reduced speed to its desired location.

Figure 5:
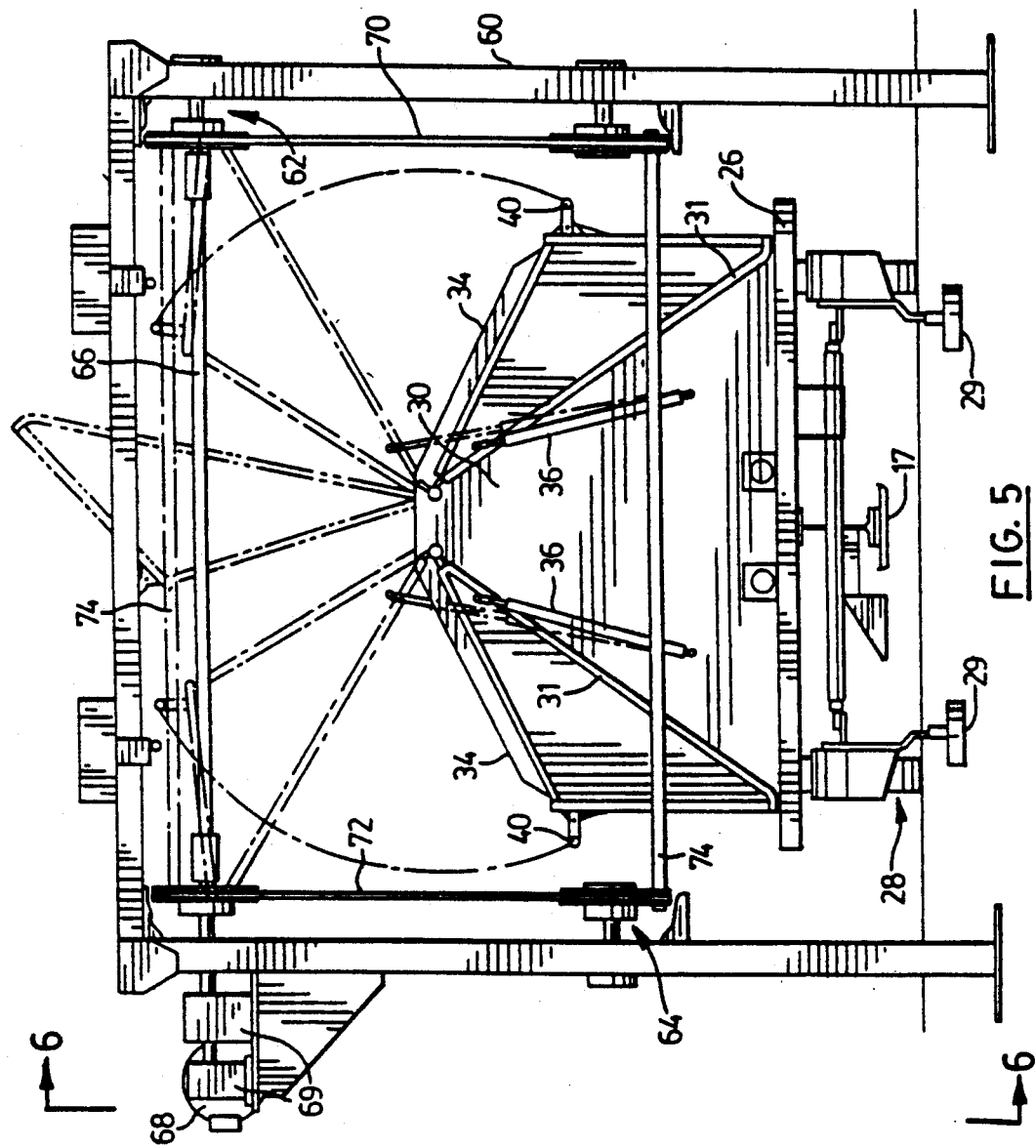
FIG. 5 is a rear view of the system illustrated in FIG. 1 taken along line 5—5.
Figure 6:
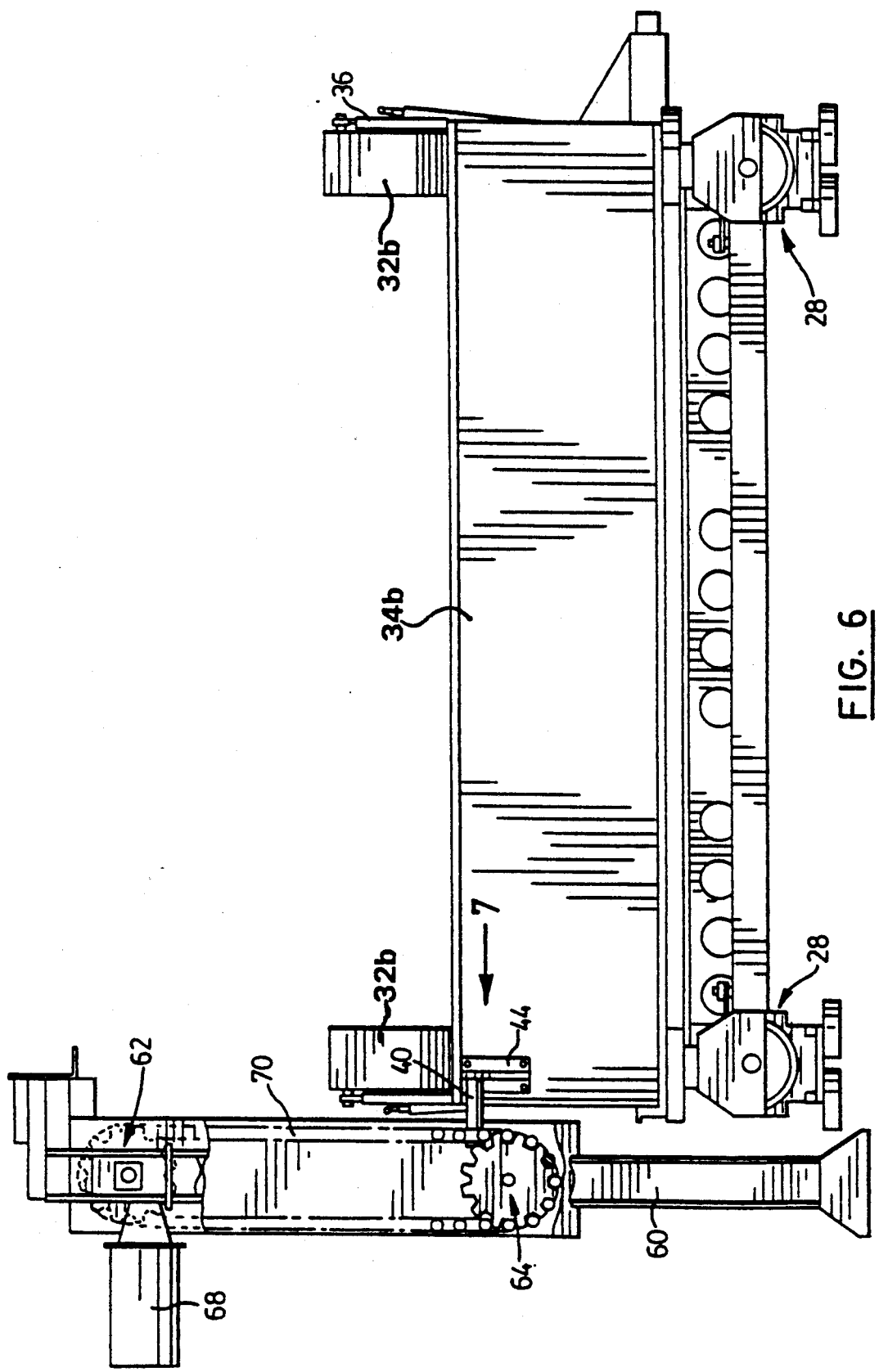
FIG. 6 is a partial sectional view of the system illustrated in FIG. 5 taken along line 6—6.

Referring now to FIGS. 1 2, 5 and 6, the cart 16 is better illustrated. As can be seen, the cart comprises a support platform 26 for supporting baggage and two axle sets 28. The cart 16 includes a reaction rail 17 secured to the undercarriage of the cart which extends along the longitudinal axis of the cart. Linear Induction Motors primaries (not shown) are located between the rails of the track 12 at spaced intervals for energizing the reaction rail 17 to provide thrust for the cart 16. Guide wheels 29 project forwardly from the leading axle 28 to cooperate with the track 12 and steer the axle sets along the track as shown in FIG. 5.

End walls 30 extend upwardly from either end of the platform and have inclined upper edges 31. Side frames 32 extend from each end wall 30 to provide support therefor and include sidewall elements 32a, beam elements 32b and a roof element 32c spanning the beam elements 32b. A pair of gull-winged doors 34 are provided on the cart 16 with each door being located on opposite sides of the cart. Since the doors 34 are identical only one will be described herein. The door 34 includes two longitudinally spaced end wall portions 34a which overly respective ones of the end walls 30. The diverging end of the end wall portions 34a are connected to opposite ends of a side wall member 34b extending the length of the cart 16. The other converging end of the end wall portions 34a are pivotally connected to the respective end wall 30 adjacent the upper portion thereof via a pin to define a hinge. Thus, when the doors 34 are in the closed position as shown in FIG. 1, the side wall members 34b define side walls for the cart and constitute retaining means for inhibiting removal of baggage stored thereon. The doors 34 may be swung upwardly about their hinges to an open position as shown in chain dot lines in FIGS. 2 and 5 to allow access to and egress from platform 26. Air springs 36 are connected between the end walls 30 and the end wall portions 3a of the doors 34 and provide vertical forces to counterbalance the weight of the doors 34 so that they fall in a controlled manner under the influence of gravity to the closed position. The air springs 36 also limit the upward pivoting movement of the doors 34 by the available extent of their travel.

The air springs 36 are located to allow a stable open position for the doors 34 if they are operated manually. In this manner, the person unloading the cart does not have to hold the doors open when unloading the cart 16 once they have been lifted to this position. The air springs 36 allow the doors 34 to move "overcentre" so that their center of gravity is inboard of the hinge point with the air springs 36 limiting further pivotal movement. To close the doors, the person merely has to push downwardly on the doors until the centre of gravity of the doors 34 moves back outboard of the hinges when the air springs 36 will again counterbalance the door.

Figure 7:
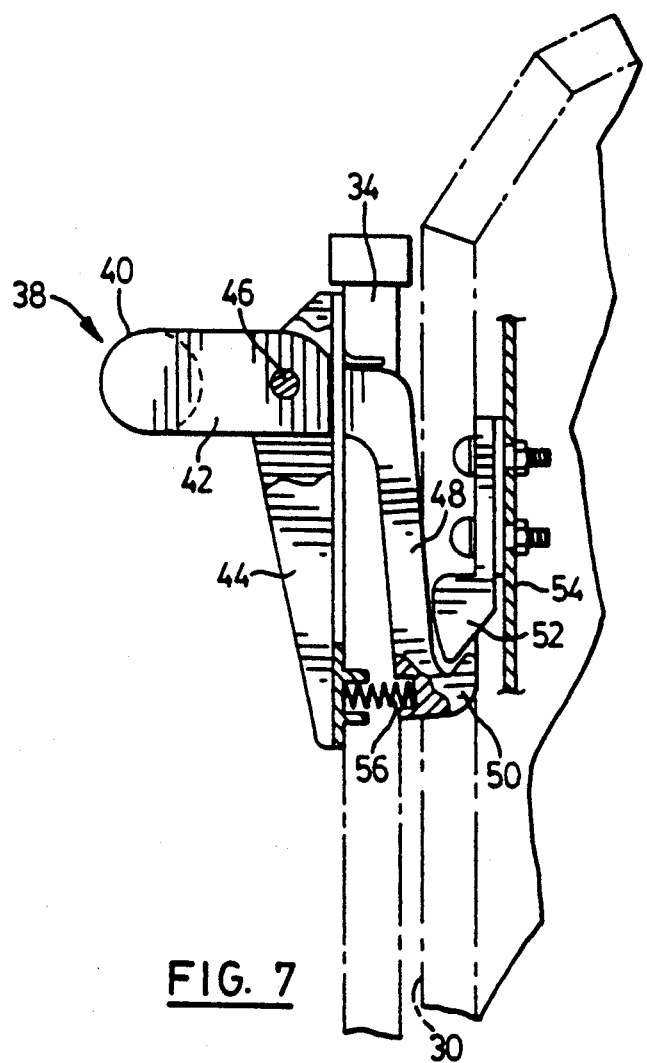
FIG. 7 is a sectional view of a portion of the system illustrated in FIG. 6.

To control movement of the doors 34, a door release mechanism is provided and generally indicated by reference 38. The mechanism 38 is connected to each door 34 by a plate 44 as shown in FIG. 7. Since each door release mechanism 38 is identical, only one will be described herein. Each of the handles 38 is pivotally connected to a plate 44 by pins 46 and includes a handle 40 which extends forwardly from one end of the cart 16 to be engaged by the door opening mechanism 18 when the doors 34 are to be opened. The handle 40 is connected to a latch 42 that extends through the door 34. The latch 42 includes a vertical portion 48 that terminates in a hook 50 at its lower end for engagement with a latch plate 52. The latch plate 52 is bolted to a bracket 54 secured to the end wall 30 of the cart 16. The latch 42 is biased to the latched position relative to the latch plate 52 by a spring 56 acting between the vertical portion 48 and the plate 44. Thus, with the latch 42 in the latched position as shown in FIG. 7, vertical movement of the door 34 is prevented by engagement of the hook 50 with the plate 52. To release the latch, the latch 42 is rotated about the pins 46 against the bias of the spring 56 so that the hook 50 clears the latch plate 52. Vertical movement of door 34 may then occur. The release of the latch and movement of the doors 34 is induced by the door operating mechanism 18 as will now be described.

Referring now to the door opening mechanism 18 as best illustrated in FIGS. 1, 5, 6 and 7, the mechanism comprises a support frame 60 which straddles the track 12 with sufficient clearance to allow the cart 16 to pass through. The frame 60 supports upper and lower pairs of gears 62 and 64 respectively, the gears of each pair being located on opposite sides of the track 12 and rotatable about a horizontal axis. The upper gears 62 are interconnected via a shaft 66 which extends at one end through the support frame 60. A motor 68 is coupled to the one end of the shaft 66 and imparts rotation thereto via a gear box 69 thereby rotating the upper gears 62. Endless loops of chains 70, 72 couple the upper and lower gears 62, 64 on each side of the track 12 to cause the lower gears 64 to rotate with the upper gears 62 when the motor 68 is actuated. A horizontal crossbar 74 extends between the chains 70, 72 and thus, moves with the chains when the motor 68 is actuated to describe a vertical reciprocating motion along horizontally spaced runs.

The mechanism 18 is positioned at the unloading station so that the crossbar 74 engages the handles 40 of a cart 16 at the unloading station as it moves vertically upward under the influence of motor 68. This causes the latches 42 to pivot about the pins 46 against the bias of the springs 56 and move the hooks 50 out of engagement with the latch plates 52. Continued upward movement of the crossbar 74 lifts the doors 34 concurrently upward about the pivots to the position shown in chain dot line in FIG. 5, with the bar 74 at its upper limit whereupon the motor 68 is interrupted. In this position, the platform 26 may be unloaded by the baggage removing device 20.

Figure 2:
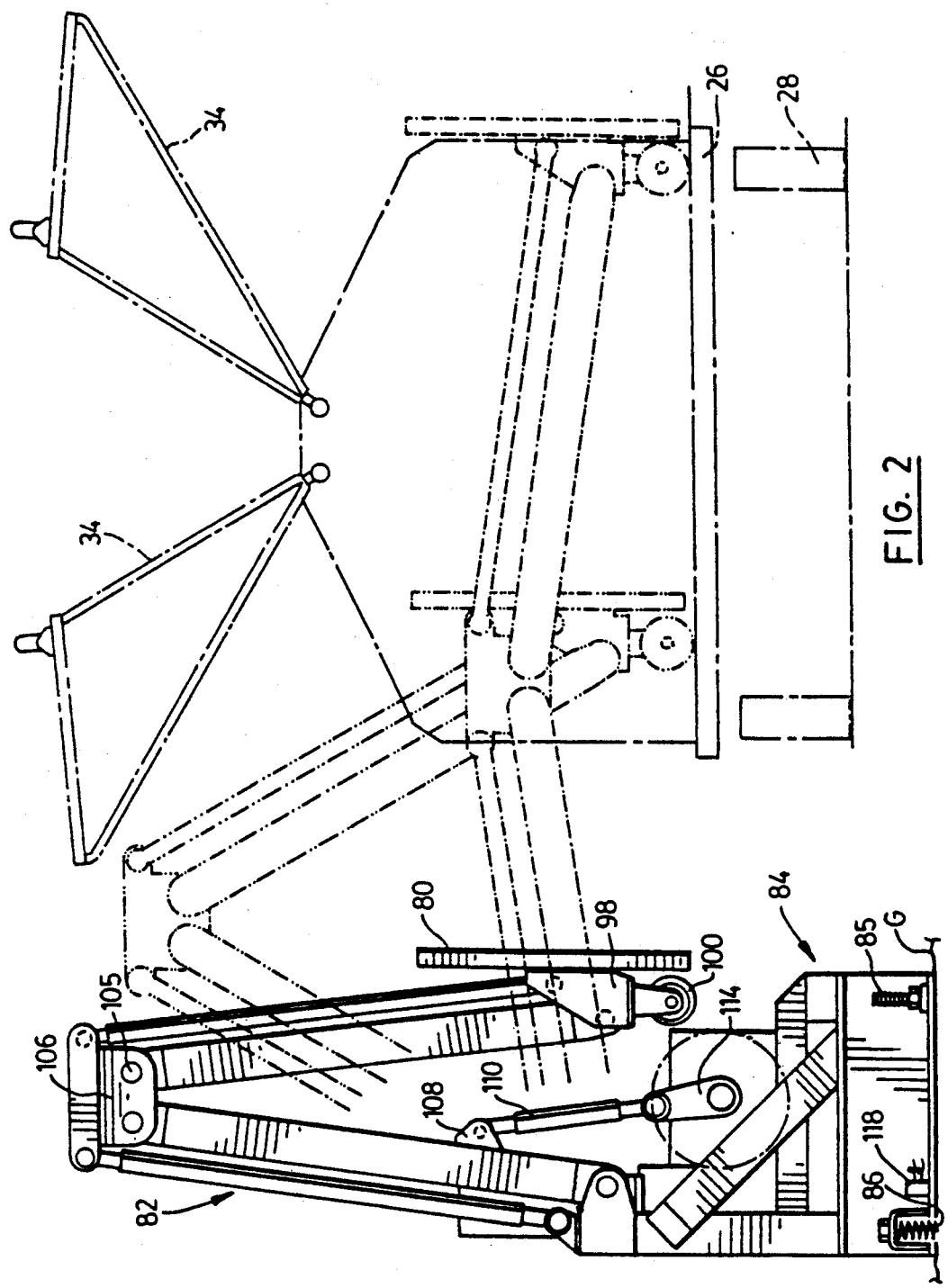
FIG. 2 is a sectional view of the system illustrated in FIG. 1 taken along line 2—2.
Figure 3:
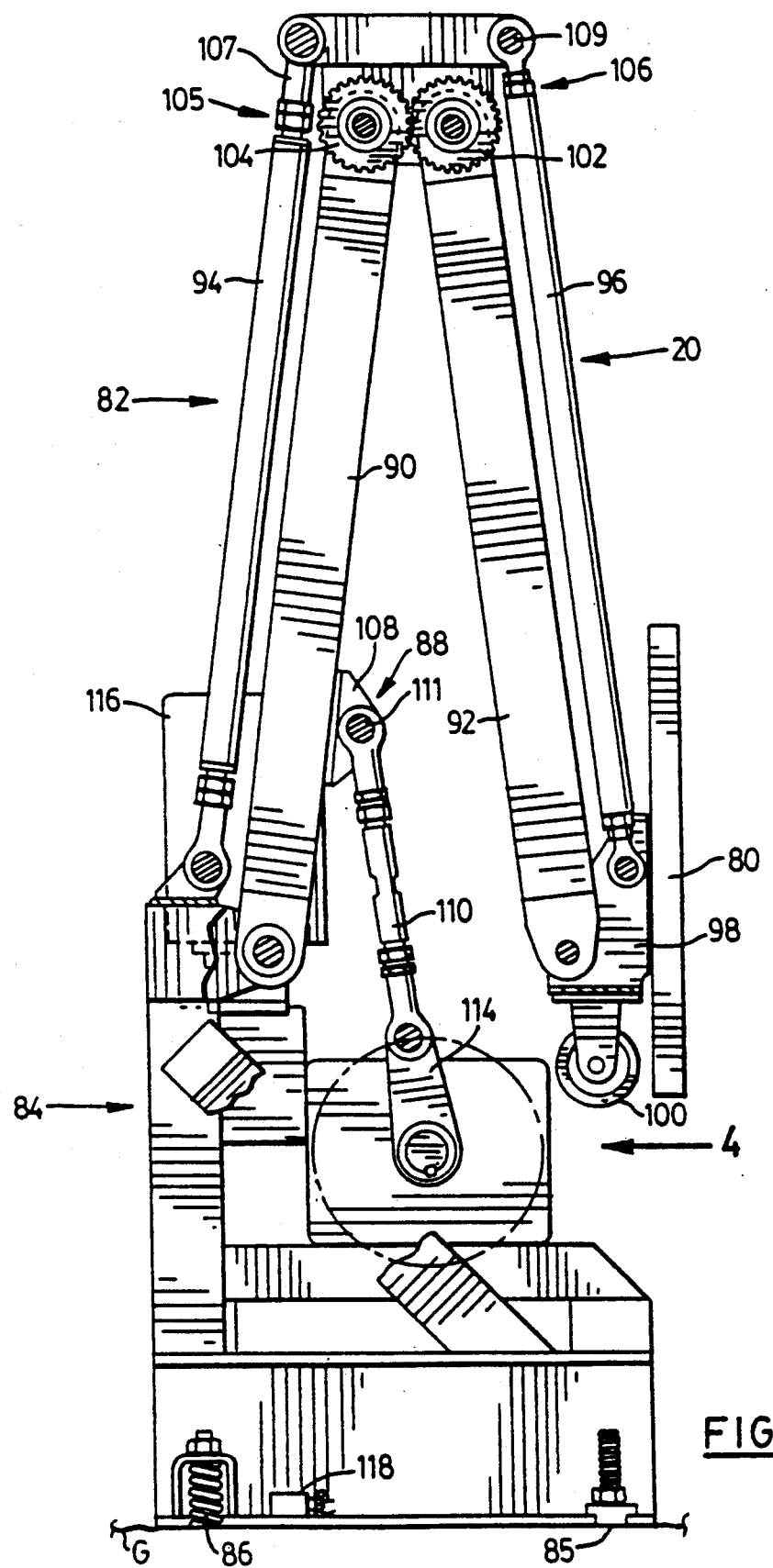
FIG. 3 is a side view of a portion of the system illustrated in FIG. 1.
Figure 4:
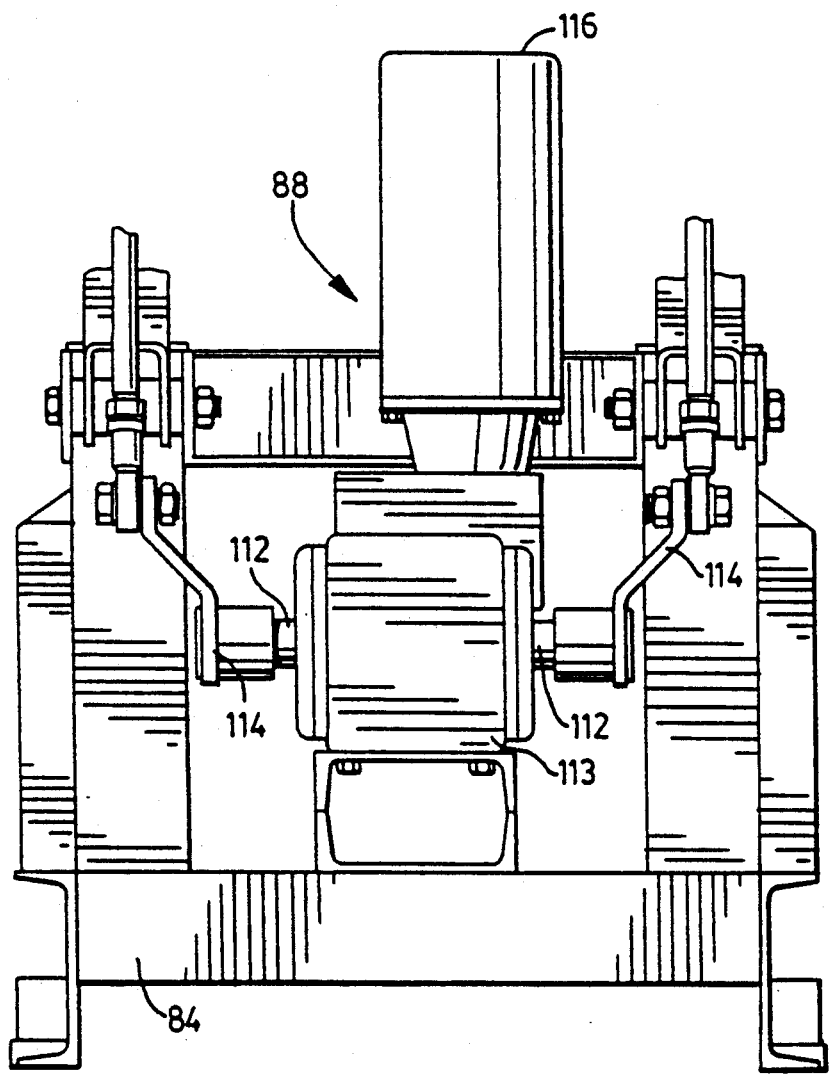
FIG. 4 is a side view of an element of the portion illustrated in FIG. 3.

Referring to FIGS. 2, 3 and 4, the baggage removing device 20 includes a pushing plate 80 secured at either end to respective ones of a pair of arm assemblies 82. The arm assemblies 82 are extendable and retractable to move the plate 80 across the platform 26 to push the baggage off of the cart 16. The other end of the arm assemblies 82 are pivotally connected to a plinth 84. The plinth 84 is resiliently secured to its support surface G by a bolt 85 and spring 86 to elevate the rear of the plinth 84. A drive assembly 88 is provided on the plinth 84 and is coupled to the arms 82 for extending and retracting the arm assemblies 82.

As shown, each arm assembly 82 comprises a pair of booms 90 and 92 and a pair of attitude maintaining links 94 and 96 respectively. The lower end of the boom 92 and link 96 is pivotally connected at vertically spaced locations to a bracket 98 mounted on the plate 80. A wheel 100 is mounted to the bottom of the bracket 98 and rests on the cart platform 26 when the arm assemblies 82 are extended to push baggage from the cart. Inboard ends of the booms 90, 92 are pivotally connected by pins 105 to a housing 106. The housing 106 is provided with lugs 107 to receive pins 109 and to connect pivotally the attitude maintaining links 94, 96 to the housing 106. Gear wheels 104, 102 are mounted on the inboard ends of booms 90, 92 respectively within the housing 106 and mesh to control relative pivotal movement between the booms 90, 92.

The lower ends of boom 90 and link 94 are pivotally connected to the plinth 84 in spaced relation so that a parallelogram linkage is defined between the links 94, boom 90, plinth 84 and housing 106. Similarly, the links 96 and boom 92 define a parallelogram linkage between the housing 106 and the bracket 98.

Movement of the arm assemblies is controlled by the drive assembly 88 that comprises a bracket 108 on each boom 90. Each bracket 108 receives a connecting rod 110 that is pivotally connected thereto via a pin 111. Each connecting rod 110 is connected at its other end to a crank 114 keyed to drive shaft 112 extending in opposite directions from a gear box 113. A motor 116 is coupled to the gear box 113 for rotating the shaft 112. Upon rotation of the drive shaft 112, the cranks 114 rotate and cause, through the connecting rods 110, pivotal movement of the booms 90 about their connection with plinth 84. As the booms pivot, the links 94 maintain the attitude of housings 106 and therefore the pins 105. The rotation of the booms 90 about pins 105 induce an opposite rotation of booms 92 about pins 105 through the interaction of gears 102, 104, causing an outward movement of the lower end of booms 92. The links 96 act to maintain the vertical attitude of the plate 80 during outward movement of the booms 92 with additional vertical support provided by wheels 100. After 180° of rotation of the drive shaft 112, the arm assemblies 82 reach the limit of their travel and continued rotation causes the arms to retract.

A controller 120 is provided to control operation of the baggage removal device 20 and the door opening mechanism 18. The controller 120 monitors the mechanism 18 and prevents the removal device 20 from operating until the doors of the cart 16 have been moved to the open position and the cart 16 is positioned accurately relative to the frame 60. The controller 120 prevents the cart 16 from moving when the arms of the removal device are in an extended position. Furthermore, the controller 120 prevents the cart 16 from being moved within the frame when the crossbar 74 is in a position below the upper surface of the cart.

A microswitch 118 is provided between the lower edge of the plinth 84 and ground G to isolate the motor 116 if a "jam" occurs in the baggage to prevent advance of the pusher plate 80. This condition is sensed by an increased load on the plinth 84 from the arm assemblies 82 causing compression of spring 86. This moves the elevated lower edge of the plinth 84 toward the ground G to open the microswitch 117 and interrupt power to the motor 116.

The unloading sequence will now be described assuming the arm assemblies 82 are retracted as shown in FIG. 1 and the crossbar 74 is elevated as indicated in chain dot line in FIG. 5. The LIM driven cart 16 is moved through the frame 60 until it is properly located relative to the baggage removal device 20 as determined by controller 120. When the cart 16 is in the proper position, the motor 68 is actuated to move the crossbar 74 from the elevated position to a position below the handles 40. This movement occurs on the rearward vertical run of the chains 70, 72 so that the crossbar 74 is clear of the handles 40, as it moves down. Continued rotation of the shaft 66 moves the crossbar 74 forwardly and upwardly to engage the underside of the handles 40 to release the latches and open the doors 34 as described above.

When the doors 34 are in the open position, the motor 68 is stopped so that the crossbar 74 supports the handles 40. The controller 120 detects this condition and allows the motor 116 to be actuated to extend and retract the arm assemblies 82. This causes the plate 80 to sweep the platform 26, thereby forcing the baggage off of the other side of the cart 16 and onto the roller set 22. From the roller set 22, the baggage is conveyed to the conveyor belt 24 where it can be transported at a reduced speed.

When the baggage has been removed from the cart 16 and the arm assemblies 82 of the removal device 20 have been fully retracted, the controller 120 inhibits further operation of the motor 116 and allows the motor 68 to be actuated until the crossbar 74 rotates over the upper gears 62. As this occurs, the crossbar 74 moves away from the cart and is removed from engagement with the underside of the handles 40 thereby allowing the doors 34 to fall closed into locking engagement. With the crossbar 74 positioned above the cart, the controller 120 allows the cart 16 to be driven through the support frame 60 so that the next cart can be unloaded in a similar manner.

It should be apparent that the cart need not be LIM driven but may be powered by other sources. Furthermore, the doors of the cart need not be "gull-wing" shape so long as they do not impede with the movement of the arms of the removal device 20 when lifted to the open position. However, the "gull-wing" doors and the vertical lifting action to open the doors ensures that they cannot accidentally open when moving between loading and unloading stations. The pusher mechanism also provides a robust unit with the drive being in-line with the loads imposed and all disposed to one side of the cart 16.

We claim:

1. A freight transportation system comprising a loading station, an unloading station and a vehicle movable therebetween to transport freight, said vehicle including a support platform to carry said freight and retaining means on the platform, said retaining means being movable from a first position in which removal of freight is inhibited and a second position in which removal of freight is permitted, said unloading station including opening means movable relative to said vehicle when said vehicle is at said unloading station and operable on said retaining means to move it between said first and second positions, continued movement of said opening means releasing said retaining means to permit said retaining means to return to said first position independently of said opening means and freight discharge means operable to discharge freight from the platform to one side of said vehicle.

2. A system according to claim 1 wherein said retaining means are doors located on opposite sides of said vehicle.

3. A system according to claim 2 wherein said doors are elevated concurrently upon moving from said first position to said second position.

4. A system according to claim 3 wherein said doors are pivoted and swing upwardly from said first position to said second position.

5. A system according to claim 3, including counterbalancing means acting on said doors to retard movement of said doors from said second position to said first position.

6. A system according to claim 2, including latch means operable on each of said doors to maintain said doors in said first position.

7. A system according to claim 6, wherein said opening means releases said latch means concurrently prior to movement of said doors concurrently from said first position to said second position.

8. A system according to claim 7 wherein said latch means are released by movement of said opening means in the same direction required to move said doors from said first position to said second position.

9. A system according to claim 8 wherein said doors are elevated upon moving from said first position to said second position.

10. A system according to claim 9 wherein said latch means includes a release member projecting from each of said doors and engagable with a vertically movable operating member associated with said opening means, vertical movement of said operating member initially releasing said latch means and subsequently moving said doors from said first position to said second position.

11. A system according to claim 10, wherein a common operating member releases each of said doors.

12. A system according to claim 11 wherein said operating member is disposed transverse to the direction of movement of said vehicle and said release members project in a direction parallel to the direction of motion of said vehicle.

13. A system according to claim 1 wherein said freight discharge means is disposed on the opposite side of said vehicle to said one side.

14. A system according to claim 1 wherein said freight discharge means operates to push freight from said platform to said one side.

15. A system according to claim 14 wherein said freight discharge means includes a boom movable laterally relative to said vehicle to push said freight from said platform.

16. A system according to claim 15 wherein said boom is formed from a pair of arms pivotally connected to one another at adjacent ends and with the opposite end of one of the arms being pivotally connected to a base disposed at said unloading station.

17. A system according to claim 16 including attitude maintaining means operable between said arms to cause the opposite end of the other of said arms to move in a generally horizontal plane upon lateral movement relative to said vehicle.

18. A system according to claim 17 including drive means operable between said base and said one arm.

19. A system according to claim 18 including overload sensing means operable to inhibit said drive means upon an excessive load being encountered by said boom.

20. A system according to claim 19 wherein said overload sensing means is responsive to loads imposed on said base by said boom.

21. A freight transportation system comprising a loading station, an unloading station and a vehicle moveable therebetween, said vehicle including a support platform to carry freight and a pair of doors located on opposite sides of said vehicle, said doors being moveable from a first position in which removal of freight is inhibited to a second position in which removal of freight is permitted, said unloading station including opening means operable upon said doors when said vehicle is stationary to move said doors concurrently to said second position to permit removal of said freight.

22. A system as defined in claim 21 wherein said doors are pivotally connected to said vehicle about their upper edges, said opening means being operable to pivot said doors about said edges to swing said doors upwardly from said first position to said second position.

23. A system as defined in claim 22, wherein said vehicle includes counter-balancing means to permit controlled movement of said doors from said second position to said first position upon release thereof by said opening means.

24. A system as defined in claim 21, wherein said vehicle further includes latch means operable to maintain said doors in said first position, said opening mechanism being operable to release said latch means upon movement of said doors from said first position to said second position.

25. A system as defined in claim 23, wherein said counter-balancing means are air springs.

26. A system as defined in claim 22 further comprising freight discharge means operable to discharge freight from said platform to one side of said vehicle upon movement of said doors to said second position by said opening means.

27. A system as defined in claim 26 wherein said freight discharge means operates to push freight from said platform to said one side.

28. A system according to claim 27 wherein said freight discharge means includes a boom moveable laterally relative to said vehicle to push said freight from said platform.

29. A system according to claim 28 wherein said boom is formed from a pair of arms pivotally connected to one another at adjacent ends and with the opposite end of one of the arms being pivotally connected to a base disposed at said unloading station.

30. A system according to claim 29, including attitude maintaining means operable between said arms to cause the opposite end of the other of said arms to move in a generally horizontal plane upon lateral movement relative to said vehicle.

31. A system according to claim 30, including drive means operable between said base and said one arm.

32. A system according to claim 31, including overload sensing means operable to inhibit said drive means upon an excessive load being encountered by said boom.

33. A system according to claim 32, wherein said overload sensing means is responsive to loads imposed on said base by said boom.

34. A system according to claim 33, wherein said latch means includes a release member projecting from each of said doors and engageable with a vertically moveable operating member associated with said opening means, vertical movement of said operating member initially releasing said latch means and subsequently moving said doors from said first position to said second position.

35. A system according to claim 34, wherein a common operating member releases each of said doors.

36. A system according to claim 35, wherein said operating member is disposed transverse to the direction of movement of said vehicle and said release members project in the direction of motion of said vehicle.

37. A system according to claim 1 wherein said opening means extends transversely to the direction of movement of said vehicle and across the path thereof, said continued movement of said opening means enabling passage of said vehicle from said unloading station.

38. A system according to claim 37 wherein said opening means engages abutments on said retaining means to move said retaining means between said first and second positions, said continued movement disengaging said opening means from said abutments.

39. A system according to claim 38 wherein said continued movement causes said opening means to move in a direction parallel to the direction of movement of said vehicle to disengage said abutments.

40. A system according to claim 39 wherein said operating means is positioned in advance of said vehicle and said continued movement maintains said operating means in an elevated position to permit passage of said vehicle.

41. A system according to claim 12 wherein said continued movement of said operating means causes translation thereof in a direction parallel to the direction of movement of said vehicle to disengage from said release members.

42. A system according to claim 41 wherein said operating means is located in advance of said vehicle and is maintained in an elevated position upon disengagement from said release members to permit passage of said vehicle.

43. A system according to claim 36 wherein continued movement of said operating member from said second position disengages said release members therefrom and permits independent movement of said doors to said second position.

44. A system according to claim 43 wherein said operating member is located in advance of said vehicle and upon disengagement from said release members is maintained in an elevated location to permit passage of said vehicle.

45. A system according to claim 22 wherein said doors are movable upwardly from said second position to a stable position to permit removal of freight in the absence of said operating means.

46. A system according to claim 45 wherein said doors are maintained in said stable position by stop means.

47. A system according to claim 46 wherein said stop means are incorporated in counterbalancing means that are operable to permit controlled movement of said doors from said second to said first position.

* * * * *